United States Patent [19]
Nishimura

[11] Patent Number: 5,182,679
[45] Date of Patent: Jan. 26, 1993

[54] INFORMATION RECORDING/REPRODUCING METHOD AND MAGNETIC TAPE SUBSYSTEM EMPLOYING THE SAME

[75] Inventor: Toshifumi Nishimura, Minamiashigara, Japan

[73] Assignee: Hitachi, Ltd., Tokyo, Japan

[21] Appl. No.: 489,668

[22] Filed: Mar. 7, 1990

[30] Foreign Application Priority Data

Mar. 8, 1989 [JP] Japan ................... 1-55561

[51] Int. Cl.⁵ .................................. G11B 5/09
[52] U.S. Cl. .................................... 360/48
[58] Field of Search ............ 360/53, 39, 40, 50, 360/48

[56] References Cited

U.S. PATENT DOCUMENTS

4,554,598 11/1985 Tarbox et al. ................ 360/48
4,796,110 1/1989 Glass et al. .................. 360/53

OTHER PUBLICATIONS

*Dictionary of Computers, Information Processing & Telecommunications*, Second Edition, Jerry M. Rosenberg.

Primary Examiner—Vincent P. Canney
Attorney, Agent, or Firm—Antonelli, Terry Stout & Kraus

[57] ABSTRACT

When invormation is recorded on a magnetic tape, a plurality of first data blocks which have been separately transferred from a higher rank apparatus are combined with each other while adding thereto control information for identifying each of the first data blocks, and are recorded on the magnetic tape as a continuous second data block. During a reproducing operation, either the first data blocks which have been separated based upon the control information, or the second data block containing the control information, are transferred to the higher rank apparatus.

16 Claims, 6 Drawing Sheets

FIG. 3

| 41 | 42 |
|---|---|
| DEVICE ADDRESS | PROCESS CONTENT |
| | |
| | |
| | |
| | |
| | |

40(DQT), 40a

FIG. 4

| 51 | 52 | 53 | 54 | |
|---|---|---|---|---|
| BLOCK NUMBER | START ADDRESS | END ADDRESS | BYTE NUMBER | |
| | | | | |
| | | | | |
| | | | | |
| | | | | |
| | | | | |

50(BCT), 50a

FIG. 5

| 61 | 62 | 63 |
|---|---|---|
| COMMAND | START ADDRESS | END ADDRESS |

60(DCT)

INFORMATION RECORDING/REPRODUCING METHOD AND MAGNETIC TAPE SUBSYSTEM EMPLOYING THE SAME

BACKGROUND OF THE INVENTION

The present invention relates to an information recording/reproducing technique for an external memory apparatus of a computer system, and to a magnetic tape subsystem employing this technique.

In, for instance, a general-purpose computer system, as an external memory apparatus for storing a large quantity of data it has been known to employ a magnetic tape subsystem constructed of a magnetic tape apparatus in which a magnetic tape is used as a recording medium and a magnetic tape control apparatus for controlling this magnetic tape apparatus.

In such a magnetic tape subsystem, the recording/reproducing operations of the information with respect to the magnetic tape are normally performed in a unit of blocks of data. When the recording/reproducing operations are executed in block, starting/stopping operations of the magnetic tape are required immediately before and immediately after the respective blocks. Since the traveling speed of the magnetic tape is not constant during the starting/stopping operations, a recording/reproducing operation is not performed during these starting/stopping operations.

As a consequence, it is necessary to provide a block interval or space between successive blocks which is not utilized for recording data thereon. Reducing such a useless block interval is important in order to increase the amount of data which can be stored on a single magnetic tape such that a magnetic tape functioning as a recording medium is effectively utilized.

On the other hand, such a conventional magnetic tape subsystem is disclosed in, for instance, JP-A-57-161956.

That is, a data buffer for temporarily storing data which are transmitted/received between a magnetic tape apparatus and a higher rank apparatus is provided in a magnetic tape control apparatus interposed between the magnetic tape apparatus and a higher rank apparatus, a plurality of data blocks which are supplied from the higher rank apparatus are stored in the data buffer, and when, for instance, the number of the data blocks stored into the data buffer exceeds a predetermined threshold value, the plurality of data blocks stored within the data buffer are combined so as to be recorded on the magnetic tape asynchronously with the operations of the higher rank apparatus.

Another technique relating to the information recording method is described in, for example, JP-A-63-197057 in which, when data having a variable length is recorded on a recording medium such as an optical disk with sectors each having a fixed length used as a recording unit, the length of the variable length data is recorded on a portion of the sector into which the head portion of the data is stored, and a specific flag is recorded on another sector into which the end portion of the data is stored.

In the first former conventional technique discussed above, although there is an advantage that the performance of the magnetic tape subsystem is improved by increasing the amount of data transmission/reception per unit time between the higher rank apparatus and subsystem, no consideration is given to the case where the size of the respective data blocks is relatively small. For instance, with respect to four different sizes of data blocks, i.e., 24K bytes, 4K bytes, 1K byte and 80 bytes, the total amounts of information which can be stored within a single magnetic tape are approximately 210M bytes, 130M bytes, 53M bytes and 5.3M bytes, respectively. There is a problem that when the sizes of the respective data blocks are small, the total amount of information stored within a single magnetic tape becomes extremely small.

Furthermore, in accordance with the second conventional technique discussed above, although there is an advantage that data having a variable length can be recorded on the recording medium in which a sector having a fixed length is used as a recording unit, there is no description of a specific arrangement and a specific apparatus when this conventional technique is applied to a recording medium such as a magnetic tape in which there is no practical limitation to, for example, a recording length of data.

SUMMARY OF THE INVENTION

Therefore, an object of the present invention is to provide an information recording/reproducing method capable of increasing an amount of information which is stored in a single magnetic tape.

Another object of the present invention is to provide a magnetic tape subsystem capable of increasing an amount of information which is stored within a single magnetic tape.

The above-described object and other objects and novel features of the present invention will become more readily apparent in the following description and the accompanying drawings.

Particular advantages of the typical preferred embodiments of the present invention as disclosed above will now be summarized.

That is, an information recording/reproducing method according to the present invention corresponds to an information recording/reproducing method in a magnetic tape. During a recording operation, a plurality of first data blocks which are separately supplied from a higher rank apparatus are combined with each other while adding thereto control information for identifying each of the first data blocks in question, and accordingly, are recorded as a continuous second data block on the magnetic tape. During a reprodcuing operation the first data blocks which have been separated based upon the control information, or the second data blocks containing the control information are transferred to the higher rank apparatus.

Also, in accordance with a magnetic tape subsystem of the present invention, this magnetic tape subsystem is constructed of a magnetic tape apparatus for recording/reproducing data which are transmitted/received to/from a higher rank apparatus on a magnetic tape functioning as a recording medium, and a data buffer interposed between this magnetic tape apparatus and the higher rank apparatus for temporarily storing the data transmitted/received to/from the magnetic tape apparatus and higher rank apparatus, and also a magnetic tape control apparatus for controlling the operation of the magnetic tape apparatus in response to an instruction given from the higher rank apparatus. The magnetic tape control apparatus is equipped with a management table for managing independently a plurality of first data blocks supplied from the higher rank apparatus. A plurality of first data blocks which are separately transmitted from the higher rank apparatus are combined with each other while adding thereto control information for identifying each of these first data blocks, and are recorded as a continuous second data block on the magnetic tape. During a reproducing operation, either the first data blocks which have been separated based upon the control information, or the second data blocks containing the control information, are transferred to the higher rank apparatus.

In accordance with the above-described information recording/reproducing method of the present invention, since a plurality of first data blocks are continuously recorded on the magnetic tape as a second data block constructed by combining the plural first data blocks, as compared to the case where the first data blocks are separately recorded, the quantity of useless block intervals which are not utilized to record information thereon can be considerably reduced, the useless portions of the magnetic tape corresponding to these block intervals can be reduced, and accordingly the amount of information which can be stored in a single magnetic tape can be increased according to the present invention.

Furthermore, in accordance with the magnetic tape subsystem according to the present invention, since a plurality of first data blocks are combined while adding thereto the control information obtained from the management table for separately managing a plurality of first data blocks which are stored into the data buffer employed in the magnetic tape control apparatus, and are recorded on the magnetic tape as a continuous second data block, as compared to the case where the first data blocks are separately recorded, the quantity of useless block intervals which are not utilized to record information thereon can be considerably reduced, the useless portions of the magnetic tape corresponding to these block intervals can be reduced, and accordingly the amount of information which can be stored in a single magnetic tape can be increased according to the present invention.

BRIEF DESCRIPTION OF THE DRAWINGS

FIG. 3 is an illustration of one example of a device queue table;

FIG. 4 is an illustration of one example of a block control table;

FIG. 5 is an illustration of one example of a device control table;

DESCRIPTION OF THE PREFERRED EMBODIMENTS

Figure 1A:
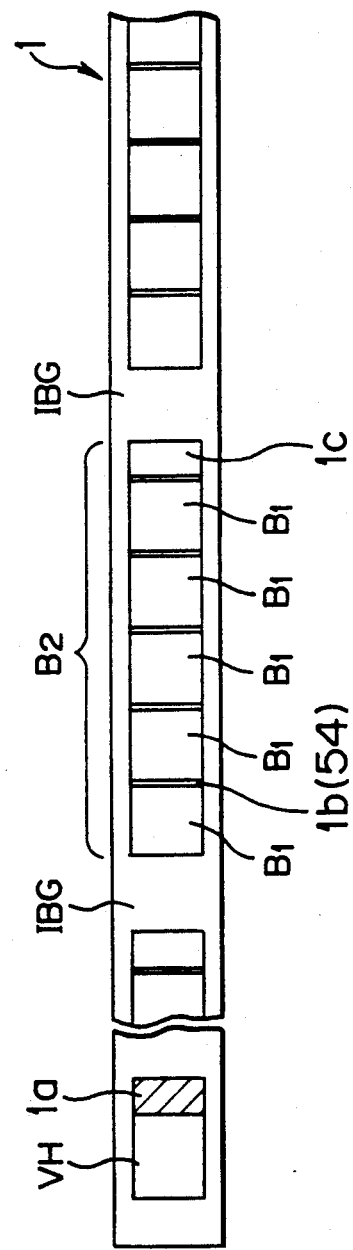
FIGS. 1A and 1B are explanatory diagrams of one example of a recording format for a magnetic tape according to an information recording/reproducing method of a preferred embodiment of the present invention compared to a conventional recording format.

Referring now to the drawings, an information recording/reproducing method according to a preferred embodiment of the present invention, and one example of a magnetic tape subsystem employing this method will be described in detail.

Figure 1B:
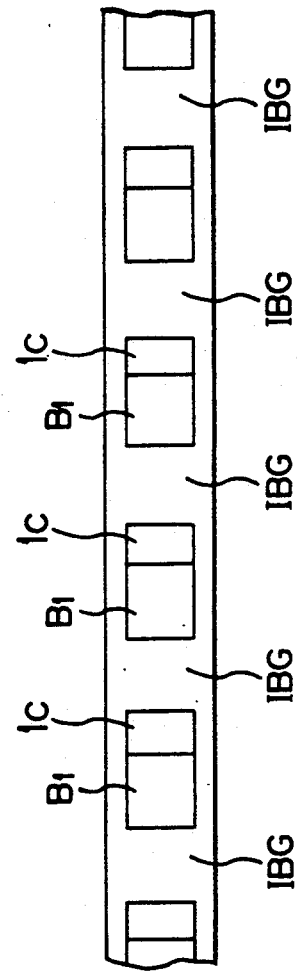
Figure 2:
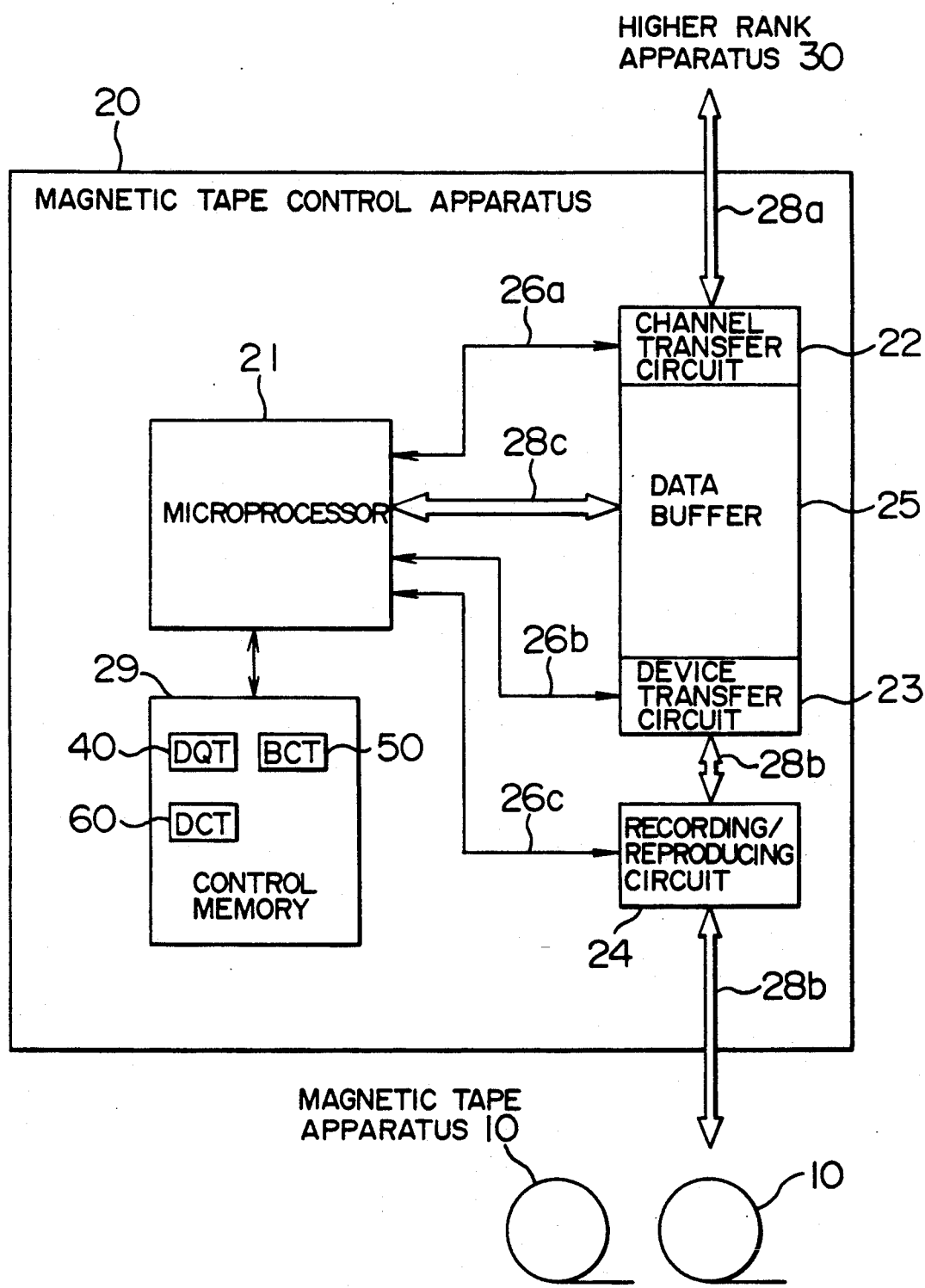
FIG. 2 is a schematic block diagram for representing one arrangement of a magnetic tape subsystem according to a preferred embodiment of the present invention.
Figure 6:
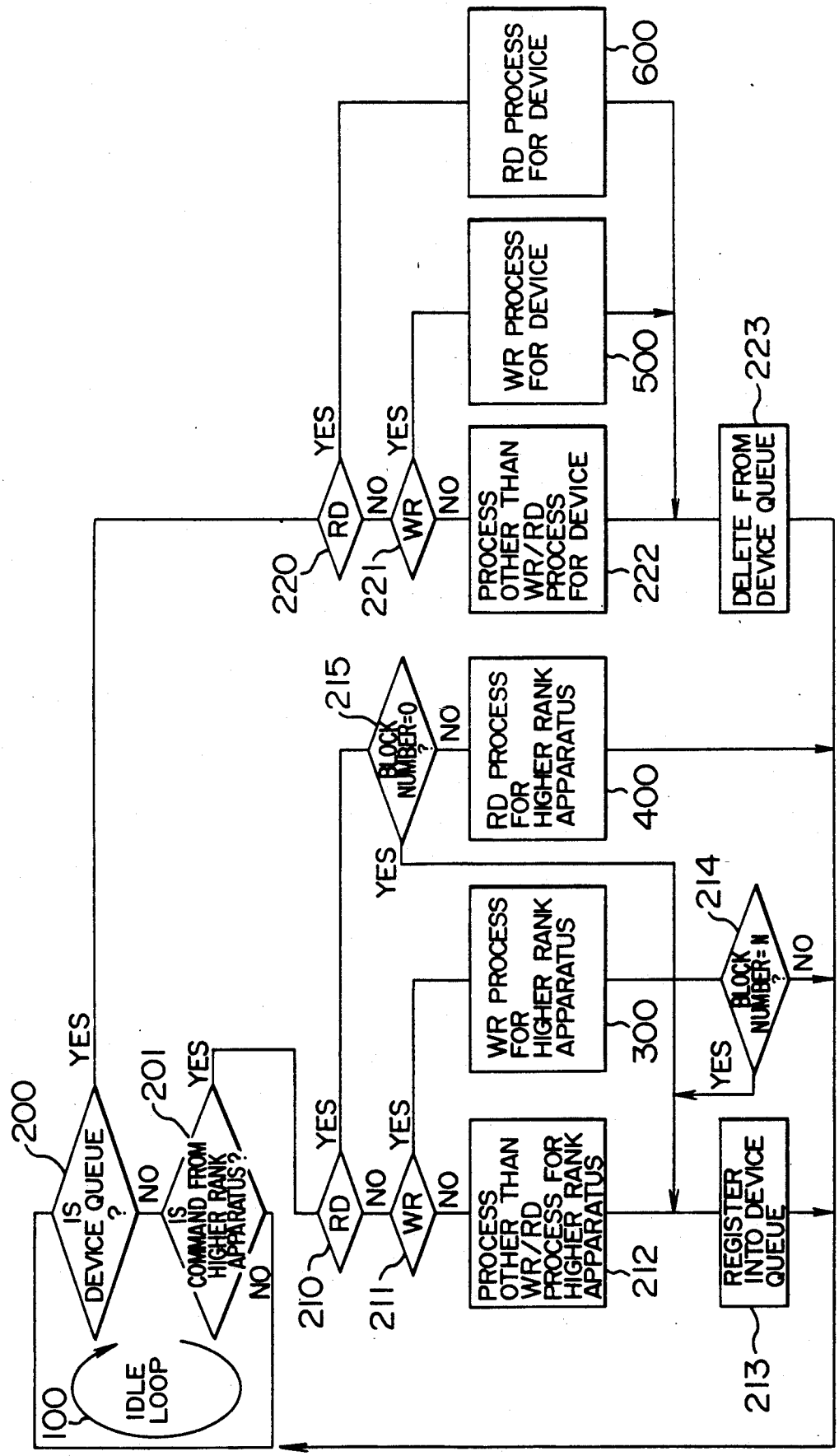
FIG. 6 is a flowchart for representing one example of an operation of a magnetic tape subsystem.

FIGS. 1A and 1B are explanatory diagrams of one example of a recording format for a magnetic tape of the information recording/reproducing method according to a preferred embodiment of the present invention compared to a conventional recording format. FIG. 2 is a schematic block diagram representing an arrangenent of a magnetic tape subsystem according to a preferred embodiment of the present invention.

First, a schematic arrangement of the magnetic tape subsystem according to the preferred embodiment will be described.

The magnetic tape subsystem according to the preferred embodiment is constructed of a plurality of magnetic tape apparatuses 10 for independently performing a recording/reproducing operation on a magnetic tape 1, and a magnetic tape control apparatus 20 interposed between each magnetic tape apparatus 10 and a higher rank apparatus 30 such as a channel apparatus connected to a central processing unit of a general-purpose computer (not shown), which transfers/receives data to/from a memory instead of this central processing unit. The magnetic tape control apparatus 20 controls data transfer/reception effected between the higher rank apparatus 30 and each magnetic tape apparatus 10.

In this magnetic tape control apparatus 20, there is provided a data buffer 25 constructed of, for instance, a semiconductor memory, for temporarily storing the data transferred/received between the higher rank apparatus 30 and each magnetic tape apparatus 10.

The data buffer 25 is connected via a data line 28a to the higher rank apparatus 30. To this data line 28a, a channel transfer circuit 22 is connected which controls the data transfer/reception performed between this data buffer 25 and higher rank apparatus 30.

Further, the data buffer 25 is connected via data lines 28b to a plurality of magnetic tape apparatuses 10. Both a device transfer circuit 23 for controlling the data transfer/reception effected between this data buffer 25 and each magnetic tape apparatus 10, and also a recording/reproducing circuit 24 are disposed in these data lines 28b.

The channel transfer circuit 22, device transfer circuit 23, and recording/reproducing circuit 24 are totally controlled by a microprocessor 21 via a control line 26a, a control line 26b, and a control line 26c, respectively.

That is to say, between the microprocessor 21, channel transfer circuit 22 and device transfer circuit 23, control information relating to, for instance, a data transfer direction, a start address/an end address of the transfer data within the data buffer 25, and a transfer byte number, is transferred/received via the respective control lines 26a and 26b when the data transfer operation is commenced and accomplished, if required.

Other control information such as the recording format of the magnetic tape 1 and error correction information is transferred/received via the control line 26c between the microprocessor 21 and the recording/reproducing circuit 24.

Furthermore, the microprocessor 21 is connected via a data line 28c to the data buffer 25, and since the microprocessor 21 arbitrarily accesses the data stored in the data buffer 25, it is possible to combine and also recover data blocks (as will be discussed later).

The control operations effected by the microprocessor 21 are realized by a program which has been stored in a control member 29.

In accordance with the preferred embodiment, a device queue table (DQT) 40, a block control table (BCT) 50, and a device control table (DCT) 60 are employed in a portion of the control memory 29.

The device queue table 40 corresponds to a queue table for managing a process command derived from the higher rank apparatus 30 with respect to each of the plural magnetic tape apparatuses 10 in accordance with a so-called "first-in-first-out" method. As represented in FIG. 3, both device addresses 41 corresponding to the respective magnetic tape apparatuses 10 and process contents (commands) 42 to be performed by these magnetic tape apparatuses 10 have been stored into a plurality of entries 40a with specific relationships therebet the device queue table 40.

There are provided a plurality of block control tables 50 corresponding to each of the plural magnetic tape apparatuses 10. As represented in FIG. 4, each of these block control tables 50 is equipped with a plurality of entries 50a into which there are stored a block number 51 which has been attached to each of a plurality of first data blocks B1 and has been separately derived from the higher rank apparatus 30 so as to be stored in the data buffer 25, a start address 52 and an end address 53 indicative of a storing position in the data buffer 25 of this first data block B1, and a byte number 54 representative of a size of the first data block B1.

Also, a plurality of device control tables 60 are provided corresponding to each of the plural magnetic tape apparatuses 10. In the respective device control tables 60, as represented in FIG. 5, a command 61 such as a recording instruction or a reproducing instruction to be supplied to the respective magnetic tape apparatuses 10, a start address 62 for representing the start of the plural first data blocks B1 in the data buffer 25 which are to be processed by this command 61, and an end address 63 for representing the end of the plural first data blocks B1 in the data buffer 25 have been stored with specific relationships therebetween.

In accordance with the preferred embodiment, as will be discussed later, for instance, a plurality of first data blocks B1 up to a maximum number N which can be stored in the data buffer 25 can be discriminated during the later reproducing operation by adding the control information 1b consisting of the byte number 54 representative of the size of the respective first data blocks B1 to the end portion of each of these first data blocks B1, which are then recorded on the magnetic tape 1 as a continuous second data block B2.

Referring now to the flowcharts shown in FIGS. 6 to 10, an example of an operation of the magnetic tape subsystem according to the preferred embodiment of the present invention will be described.

For the sake of easy understanding, the following description relates to data transmission/reception performed between a single magnetic tape apparatus 10 and the higher rank apparatus 30.

First, the microprocessor 21 of the magnetic tape control apparatus 20 monitors an incoming command from the higher rank apparatus 30 in an idle loop 100 in which step 200 and step 201 are continuously repeated. In the step 200, a judgement is made whether or not there exists a device queue, whereas another judgement is made whether or not there is a command frmo the higher rank apparatus 30 in the step 201.

Then, when in the step 201, an incoming command (process requirement) from the higher rank apparatus 30 is detected, a check is made whether or not the detected command corresponds to a recording instruction "WR" (step 211) or a reproducing instruction "RD" (step 210).

When this command corresponds to the recording instruction WR, a first data block B1 derived from the higher rank apparatus 30 is written in the data buffer 25 (step 300).

Figure 7:
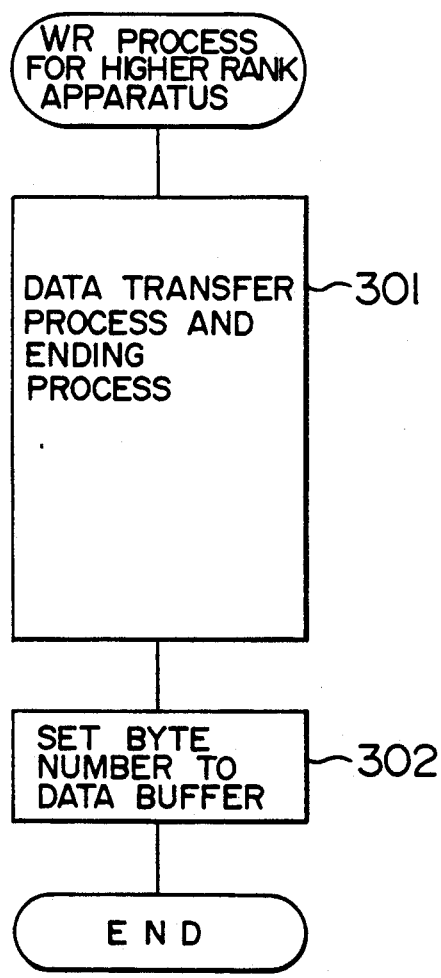
FIG. 7 is a flowchart showing a detail of part of the operation of the magnetic tape subsystem shown in FIG. 6.

The operations of this step 300 are as follows. That is, as shown in FIG. 7, the first data block B1 is written from the higher rank apparatus 30 into the data buffer 25 (step 301), a byte number having a constant size of, for instance, 4 bytes representative of the size of this first data block B1 is written just after this first data block B1 in the data buffer 25 as the control information 1b (step 302), and furthermore, a block number 51 of the first data block B1, a start address 52 and an end address 53 in the data buffer 25, and also a byte number 54 of the first data block B1 and the like are registered in the block control table 50.

Thereafter, a judgement is made whether or not the number of the first data blocks B1 written into the data buffer 25 exceeds a predetermined number "N" (step 214). If this number does not exceed the predetermined number N, the process is returned to the idle loop 100 to await a new command from the higher rank apparatus 30 for the first data block B1 (step 214), and then the above-described steps are repeated.

On the other hand, when the number of the first data blocks B1 written into the data buffer 25 reaches the predetermined number N, a device addres 41 of the magnetic tape apparatus 10 at which the N first data block B1 should be recorded and a process content 42 such as a recording instruction WR or a reproducing instruction RD are registered into the device queue table 40 (step 213) and thereafter the process is returned to the idle loop 100.

It should be noted that the above-described number "N" has been set to, for example, the maximum number of the first data block B1 which can be found stored in the data buffer 25 in the preferred embodiment.

Then, in the idle loop 100, the device queue in the device queue table 40 which has been registered in the previous operation is detected at the step 200, and the process for the magnetic tape apparatus 10 is executed.

In other words, first at steps 220 and 221, a judgement is made whether or not the recording instruction WR, the reproducing instruction RD, or a process other than the WR and RD instructions is contained in the process content of the device queue table 40.

In this case, as previously described, since the process under discussion corresponds to the recording instruction WR, a judgement of the recording instruction WR is made at a step 221 and the recording process with respect to the magnetic tape apparatus 10, corresponding to the device address 41 in the device queue table 40 is performed (step 500).

Figure 9:
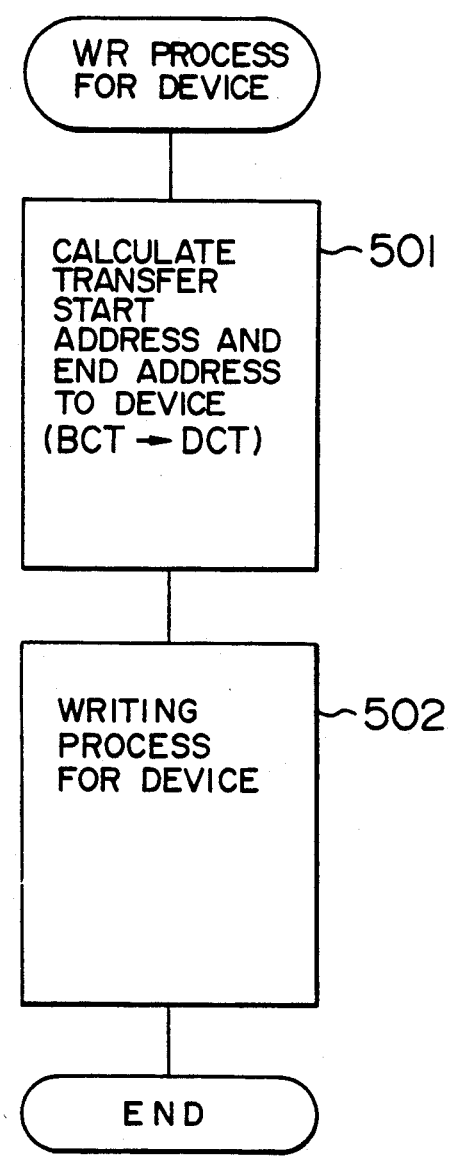
FIG. 9 is a flowchart showing a detail of part of the operation of the magnetic tape subsystem shown in FIG. 6.

As represented in FIG. 9, the process defined at this step 500 is performed as follows. Both the start address 62 and end address 63 of the "N" first data blocks B1 in the data buffer 25 are calculated from the contents of the block control table 50, and then rewritten together with the recording instruction WR into the device control table 60 (step 501).

It should be understood that the start address 62 in the device control table 60 corresponds to the start address 52 of the initial first data block B1 in the data buffer 25, and the end address 63 corresponds to an address defined by adding 4 bytes for the byte number of the control information 1b to the end address 53 of the final first data block B1 in the data buffer 25.

Furthermore, based upon the start address 62 and end address 62 in the device control table 60, as represented in FIG. 1A, "N" first data blocks B1 are written as a continuous second data block B2 containing the control information 1b from the data buffer 25 to the relevant magnetic tape apparatus 10 (step 502), and error correction information 1c which has been produced by a predetermined algorithm in the microprocessor 21 and recording/reproducing circuit 24 is added to the end of the second data block B2.

After the process defined at the step 500 has been completed, the corresponding entry is deleted from the device queue table 40 (step 223), and thereafter the process is returned to the idle loop 100.

On the other hand, a data readout process is performed from the specific magnetic tape apparatus 10 into the higher rank apparatus 30 as follows.

At first, a command for the reproducing instruction RD issued from the higher rank apparatus 30 is detected at the step 201 of the idle loop 100, and further the judgement that this command corresponds to the reproducing instruction RD is made in the step 210, so that the process is advanced to process the reproducing instruction RD with respect to the higher rank apparatus 30 at a step 400.

Before this step 400, a judgement is first made whether or not the number of the corresponding first data block B1 in the data buffer 25 is equal to "0"(step 215).

Since the readout process from the magnetic tape apparatus 10 has not yet been executed at the time when the first reproducing instruction RD is issued, the number of the corresponding first data block B1 stored in the data buffer 25 will "0" at that time. As a result, at first, the process is advanced to a step 213 where the relevant reproducing instruction RD with respect to the device queue table 40 is registered, and thereafter the process is returned to the idle loop 100.

Then, at the idle loop 100, the reproducing instruction RD which has been registered in the device queue table 40 in the previous operation is detected at the step 200 and judgement of the reproducing instruction RD is made in a step 220. Then, the process is advanced to the execution of the reproducing instruction RD with respect to the magnetic tape apparatus 10 in question which is denoted by the device address 41 in the device queue table 40 (step 600).

Figure 10:
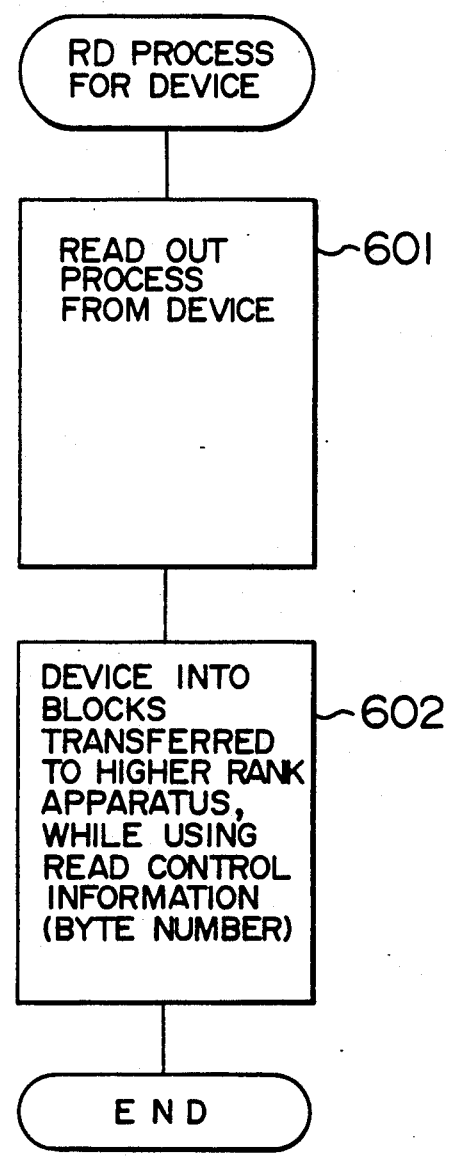
FIG. 10 is a flowchart showing a detail of part of the operation of the magnetic tape subsystem shown in FIG. 6.

In this step 600, as represented in FIG. 10, an entire second data block B2 which has been continuously recorded on the magnetic tape 1 mounted on the magnetic tape apparatus 10 is read into the data buffer 25, and the start address 62 and end address 63 of the second data block B2 stored in the data buffer 25 are registered into the device control table 60 (step 601).

At this time, the recording/reproducing circuit 24 and microprocessor 21 perform the error correction process for the readout operation by a predetermined error correction algorithm based upon error correction information 1c which was recorded together with the second data block B2.

Furthermore, in order to prepare for transmission of the plurality of first data blocks B1 constituting the second data block B2 in question to the higher rank apparatus 30, both the start address 52 and end address 53 of the respective first data blocks B1 stored in the data buffer 25 are calculated based upon the control information 1b (the byte number of the relevant first data block Bl) which was previously recorded on the respective end portions of the relevant first data blocks B1, and then are recorded in the block control table 50 (step 602).

That is to say, in accordance with the preferred embodiment, as previously described, since the byte number of a first data block B1 is added to the end of this first data block B1 as control information 1b for use in reproduction the end address 53 and start address 52 for the block control table 50 are required to be squentially calculated in this order beginning with the final first data block B1.

In other words, the end address 53 of the final first data block B1 corresponds to a value obtained by subtracting 4 bytes for the byte number of the control information 1b from the end address 63 of the device control table 60. Furthermore, to obtain the start address 52 of this final first data block B1, the byte number of the final first data block B1 is first calculated from the data buffer 25.

The byte number to be obtained has been fetched as the control information 1b in the data buffer 25 just after the end address of the previously obtained first data block B1, so that the microprocessor 21 reads out the byte number via the data line 28c.

Assuming now that the value of the control information 1b which has been read out from the data buffer 25 is equal to "n", the start address 52 of the final first data block B1 corresponds to a value obtained by subtracting (n−1) from the end address 53.

In general, assuming that the control information 1b is equal to "l" bytes and the size of the relevant first data block B1 is equal to "$n_m$" bytes, both a start address "Sm" and an end address "Em" of m-th first data block B1 are expressed as follows:

$$S_m = E_M = n_{m+1}$$

$$E_m = S_{m+1} - 1 - 1.$$

A storage address "Dm" of the control information 1b in the data buffer 25, which represents a byte number of m-th first data block B1, is obtained by:

$$D_m = S_{m+1} - 1$$

Thus, after the series of processes at the step 600 defined above has been accomplished, the entry in question is deleted from the device queue table 40 at a step 223, and then the process is returned to the idle loop 100.

Thereafter, when the reproducing instruction RD is again issued from the higher rank apparatus 30 to the same magnetic tape apparatus 10, this command is branched via a step 210 to a step 215.

At this step 215, since "n" first data blocks B1 have been already fetched into the data buffer 25, this reproducing instruction RD is immediately executed at the subsequent step 400.

Figure 8:
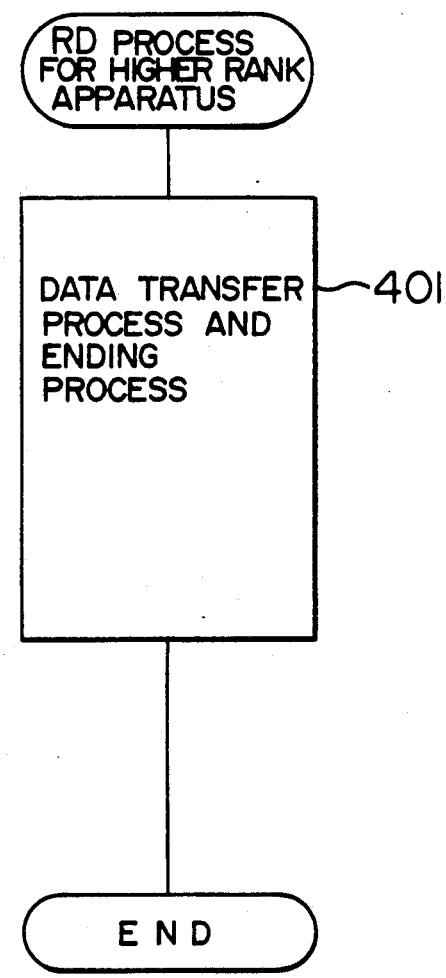
FIG. 8 is a flowchart showing a detail of part of the operation of the magnetic tape subsystem shown in FIG. 6.

At the step 400, as shown in FIG. 8, the start address 52 and end address 53 of the first data block B1 in question in the data buffer 25 are recognized from the entry of the block control table 50 corresponding to the block number in question, and then this first data block B1 is transferred to the higher rank apparatus 30 (step 401).

The transfer process of the respective first data blocks B1 to the higher rank apparatus 30 at the step 400 is repeated based upon the judgement effected at a step 215 preceding this step 400 until the "n" first data blocks B1 stored in the data buffer 25 have been transferred to the higher rank apparatus 30. When the data buffer 25 becomes empty, this is registered in the device queue table 40 at a step 213, and then the above-described, process defined at the step 600 is executed, in which another second data block B2 constructed of a plurality of first data blocks B1 is read from the relevant magnetic tape apparatus 10 to the data buffer 25.

It should be noted that as the process defined at steps 212 and 222 other than the recording instruction WR and reproducing instruction RD, there are such processes that, for instance, conditions of the respective magnetic tape apparatuses 10 are communicated to the higher rank apparatus 30, and the mounting/demounting of the magnetic tape 1 to the magnetic tape apparatus 10 is requested of an operator of the system. However, these processes are well known and have no specific relationship with the preferred embodiment. Therefore, no further explanation is made in the present specification.

In the above-described explanations, a plurality of first data blocks B1 which have been continuously fetched as the second data block B2 from the magnetic tape apparatus 10 to the data buffer 25, are separately transferred to the higher rank apparatus 30. However, the present invention is not limited thereto, but the second data block B2 containing the control information 1b may be transferred while maintaining this data condition to the higher rank apparatus 30 and, as described in the previous step 602, each of the first data blocks B1 may be processed by the recovery/division operation in the higher rank apparatus 30.

As represented in FIG. 1A, in general, the control information VH for identifying the recording density or the like is recorded on the head portion of the magnetic tape 1. In accordance with the preferred embodiment, identification information 1a whose format is different from the conventional format is recorded on a portion of this control information VH in order to indicate whether or not the magnetic tape 1 in question has been recorded by the method according to the preferred embodiment.

It should be noted that the present invention is not limited to such a case that, as previously described, the control information 1a having a format different from the conventional format is recorded on the magnetic tape 1 so as to discriminate the above-described magnetic tape, but may be applied to other methods such that discrimination is made by attaching a bar code, a silver coated sheet and the like to a reel (not shown in detail) of the magnetic tape 1.

As previously described, since the maximum number of first data blocks B1 each having a relatively small size which can be stored in the data buffer 25 are combined with each other and are continuously recorded on the magnetic tape 1 as a second data block B2 having a relatively large size in accordance with the information recording/reproducing method of the present invention, a quantity of useless block intervals IBG can be considerably reduced as compared with such a conventional case that each of the first data blocks B1 is independently recorded on the magnetic tape as represented in FIG. 1B.

As a result, the useless tape portions of the magnetic tape 1 which are required for the block intervals IBG can be saved and therefore a total amount of information which can be stored in a single magnetic tape 1 can be increased as compared with the conventional information recording/reproducing method.

Assuming now that 10 first data blocks B1 which have been supplied from the higher rank apparatus 30 are combined with each other to form a single second data block B2, and this second data block B2 is recorded on the magnetic tape 1, the memory capacities thereof can be increased as follows. In the case that a size of the respective first data blocks B1 is selected to be 24K bytes, a memory capacity of 210M bytes is increased to 240M bytes, i.e., 1.15 times higher than that of the conventional method. In the case that a size of the respective first data blocks B1 is selected to be 4K bytes, a memory capacity of 130M bytes is increased to 220M bytes, i.e., 1.7 times higher than that of the conventional method. Furthermore, in the case that a size of the respective first data blocks B1 is selected to be 1K byte, a memory capacity of 53M bytes is increased to 180M bytes, i.e., 3.4 times higher than that of the conventional method. Also, in the case that a size of each of the first data blocks is selected to be 80 bytes, a memory capacity of 5.3M bytes is increased to 44M bytes i.e. 8.3 times higher than that of the conventional method.

As a consequence, when a data base is constructed in accordance with the magnetic tape subsystem of the present invention, a floor space required for storing the magnetic tapes 1 may be minimized, which may be advantageous when it is needed to save space.

While the present invention has been described with reference to the preferred embodiments invented by the inventors, it is obvious that the present invention is not limited to the above-described preferred embodiments, but may be changed, substituted or modified without departing from the technical scope and spirit of the present invention.

For instance, the format of the magnetic tape and the arrangement of the magnetic tape control apparatus in the magnetic tape subsystem are not limited to the above-described preferred embodiments.

Particular advantages of the typical preferred embodiments of the present invention as disclosed above will now be summarized.

That is, the information recording/reproducing method according to the present invention is an information recording/reproducing method for a magnetic tape. During the recording operation, a plurality of first data blocks which are separately supplied from the higher rank apparatus are combined with each other while adding thereto the control information for identifying each of the first data blocks in question, and accordingly are recorded as a continuous second data block on the magnetic tape. During the reproducing operation, the first data blocks which have been separated based upon the control information, or the second data blocks containing the control information, are transferred to the higher rank apparatus. In comparison with such a case that the first data blocks are separately recorded, the quantity of the useless block intervals which are not utilized to record information thereon can be considerably reduced, the useless portions of the magnetic tape corresponding to these block intervals can be reduced, and accordingly the amount of information which can be stored in a single magnetic tape can be increased according to the present invention as compared with the information storage amount of the magnetic tape having the same tape length as that of the above-described tape according to the conventional information recording/reproducing method.

Moreover, in accordance with the magnetic tape subsystem of the present invention, this magnetic tape subsystem is constructed of the magnetic tape apparatus for recording/reproducing the data which are transmitted/received to/from the higher rank apparatus on the magnetic tape functioning as the recording medium, and the data buffer interposed between this magnetic tape apparatus and the higher rank apparatus for temporarily storing the data transmitted/received to/from the magnetic tape apparatus and higher rank apparatus, and also the magnetic tape control apparatus for controlling the operation of the magnetic tape apparatus in response to the instruction given from the higher rank apparatus. The magnetic tape control apparatus is equipped with a management table for managing independently a plurality of first data blocks supplied from the higher rank apparatus. A plurality of first data blocks which are separately transmitted from the higher rank apparatus are combined with each other while adding thereto the control information for identifying each of these first data blocks, and are recorded as a continuous second data block on the magnetic tape. During the reproducing operation, either the first data blocks which have been separated based upon the control information, or the second data blocks containing the control information, are transferred to the higher rank apparatus. As a consequence, in comparison with such a case that the first data blocks are separately recorded, the quantity of the useless block intervals which are not utilized to record information thereon can be considerably reduced, the useless portions of the magnetic tape corresponding to these block intervals can be reduced, and accordingly the amount of information which can be stored in a single magnetic tape can be increased according to the present invention as compared with the information storage amount of the magnetic tape having the same tape length as that of the above-described tape according to the conventional information recording/reproducing method.

I claim:

1. An information recording/reproducing method for a magnetic tape, comprising the steps of:
    combining a plurality of first data blocks which have been separately transferred from a higher rank apparatus with each other while adding thereto control information for identifying each of said first data blocks;
    recording the combined first data blocks with the added control information on the magnetic tape as a continuous second data block;
    reading said second data block from the magnetic tape; and
    either separating said first data blocks from said second data block based on the control information in said second data block and transferring the separated first data blocks to the higher rank apparatus, or transferring said second data block containing the control information to the higher rank apparatus.

2. An information recording/reproducing method as claimed in claim 1, wherein the control information includes byte numbers each representing a length of a respective one of said first data blocks, the byte numbers being added to said first data blocks immediately before or immediately after respective ones of said first data blocks.

3. An information recording/reproducing method as claimed in claim 1, wherein identification information indicative of an information recording format different from conventional recording format is written onto a starting portion of said magnetic tape.

4. An information recording/reproducing method as claimed in claim 2, wherein identification information indicative of an information recording format different from a conventional recording format is written onto a starting portion of said magnetic tape.

5. An information recording/reproducing method as claimed in claim 1, wherein the combining step includes combining the plurality of first data blocks with each other while adding thereto the control information such that the first data blocks are not separated by block intervals; and
    wherein the recording step includes recording the combined first data blocks with the added control information on the magnetic tape as the continuous second data block with a block interval such that a plurality of second data blocks recorded on the magnetic tape will be separated by block intervals.

6. A magnetic tape subsystem comprising:
    a magnetic tape apparatus for recording/reproducing data which is transmitted/received to/from a higher rank apparatus on a magnetic tape serving as a recording medium;
    a data buffer interposed between the magnetic tape apparatus and the higher rank apparatus for temporarily storing the data transmitted/received to/from the magnetic tape apparatus and the higher rank apparatus; and
    a magnetic tape control apparatus for controlling the operation of the magnetic tape apparatus in response to an instruction received from the higher rank apparatus, said magnetic tape control apparatus being provided with a management table for use in independently managing a plurality of first data blocks;
    wherien, during a recording operation, the magnetic tape control apparatus, using the management table, combines a plurality of first data blocks which have been separately transmitted from the higher rank apparatus with each other while adding thereto control information for identifying each of the first data blocks and records the combined first data blocks with the added control information on the magnetic tape as a continuous second data block; and
    wherein, during a reproducing operation, the magnetic tape control apparatus reads the second data block from the magnetic tape, and, using the management table, either separates the first data blocks from the second data block bzsed on the control information in the second data block and transmits the separated first data blocks to the higher rank apparatus, or transmits the second data block containing the control information to the higher rank apparatus.

7. A magnetic tape subsystem as claimed in claim 6, wherein block numbers which have been added to respective ones of said first data blocks, storage addresses of said first data blocks in said data buffer, and byte numbers each representing a length of a respective one of said first data blocks are recorded in said management table, and wherein said byte numbers are added as said control information to said first data blocks immediately before or immediately after respective ones of said first data blocks.

8. A magnetic tape subsystem as claimed in claim 6, wherein said second data block includes a maximum number of said first data blocks which can be stored in said data buffer.

9. A magnetic tape subsystem as claimed in claim 7, wherein said second data block includes a maximum number of said first data blocks which can be stored in said data buffer.

10. A magnetic tape subsystem as claimed in claim 6, wherein identification information representative of an information recording format different from a recording format is written onto a starting portion of said magnetic tape.

11. A magnetic tape subsystem as claimed in claim 7, wherein identification information representative of an information recording format different from a conventional recording format is written onto a starting portion of said magnetic tape.

12. A magnetic tape subsystem as claimed in claim 8, wherein identification information representative of an information recording format different from a conventional recording format is written onto a starting portion of said magnetic tape.

13. A magnetic tape subsystem as claimed in claim 9, wherein identification information representative of an information recording format different from a conventional recording format is written onto a starting portion of said magnetic tape.

14. A magnetic tape subsystem as claimed in claim 6, wherein, during the recording operation, the magnetic tape control apparatus, using the management table, combines the plurality of first data blocks with each other while adding thereto the control information such that the first data blocks are not separated by block intervals, and records the combined first blocks with the added control information on the magnetic tape as the continuous second data block with a block interval such that a plurality of second data blocks recorded on the magnetic tape will be separated by block intervals.

15. An information recording/reproducign method for a magnetic tape in which data blocks recorded on the magnetic tape are separated by block intervals, comprising the steps of:

successively receiving a plurality of first data blocks from a higher rank apparatus;

combining the first data blocks with each other while adding thereto control information for identifying each of the first data blocks to form a continuous second data block such that the first data blocks are not separated by block intervals in the second data block;

recording the second data block on the magnetic tape with a block interval such that a plurality of second data blocks recorded on the magnetic tape will be separated by block intervals;

reading out the second data block from the magnetic tape; and either separating the first data blocks from the second data block based on the control information in the second data block and transferring the separated first data blocks to the higher rank apparatus, or transferring the second data block containing the control information to the higher rank apparatus.

16. A magnetic tape subsystem comprising:

a magnetic tape apparatus for recording/reproducing data on a magnetic tape which records data blocks on the magnetic tape such that the data blocks are separated by block intervals; and a magnetic tape control apparatus coupled with the magnetic tape apparatus and a higher rank apparatus for controlling a recording/reproducing operation of the magnetic tape apparatus in response to an instruction received from the higher rank apparatus and for transferring data between the magnetic tape apparatus and the higher rank apparatus;

wherein the magnetic tape control apparatus includes:

means for successively receiving a plurality of first data blocks from the higher rank apparatus;

means for combining the first data blocks with each other while adding thereto control information for identifying each of the first data blocks to form a continuous second data block such that the first data blocks are not separated by block intervals in the second data block;

means for recording the second data block on the magnetic tape with a block interval such that a plurality of second data blocks recorded on the magnetic tape will be separated by block intervals;

means for reading out the second data block from the magnetic tape;

means for either separating the first data blocks from the second data block based on the control information in the second data block and transferring the separated first data blocks to the higher rank apparatus, or transferring the second data block containing the control information to the higher rank apparatus;

control memory means for storing a management table for use in independently managing the first data blocks; and means for controlling the receiving means, the combining means, the recording means, the reading means, and the separating and transferring means in accordance with the instruction received from the higher rank apparatus and the management table stored in the control memory means.

* * * * *